Patented July 5, 1949

2,475,554

UNITED STATES PATENT OFFICE 2,475,554

PROCESS OF MANUFACTURING FOODSTUFFS FROM LEGUMINOSAE

Fredrik André Möller, Haren, Netherlands, assignor to N. V. W. A. Scholten's Chemische Fabricken, Hoogezand, Netherlands, a corporation of the Netherlands No Drawing. Application November 15, 1946, Serial No. 710,238. In the Netherlands January 22, 1943

4 Claims. (Cl. 99—104)

It is known to convert starch into cold swelling starch by suddenly heating a mixture of starch with a limited amount of water (½–2 parts by weight of water on 1 part by weight of starch) on a rotary drum to a temperature adapted to remove the water and to gelatinize the starch, while pressing out the mass to a thin cohesive layer or fleece which is simultaneously dried, whereafter the dry product is comminuted.

In Dutch Patent Specification No. 44,353 it has been proposed to prepare cold swelling starch from a flour obtained from peas and beans, with a view to the presence in the said flours of lecithin, which has the property of diminishing the well-known tendency of cold swelling starch to form lumps when dissolved in water. In practice, however, satisfactory results were generally not obtained in this case, since, besides starch, peas and beans contain large amounts of other substances, particularly proteins which unfavourably affect the swelling power of the starch in the final product.

According to the invention, products of considerably better properties are obtained by boiling or steaming the comminuted leguminosae (if necessary after a preliminary drying treatment) for at least half an hour, preferably for ½–2 hours, prior to the cold swelling starch process.

The invention accordingly has for its object the manufacture of dry foodstuffs in cooked condition from leguminosae, which consists in precooking the previously comminuted leguminosae for a period of at least half an hour, subsequently heating the precooked leguminosae in the presence of 50–200% of water, calculated on the dry material, on a rotary drum to a high temperature above the gelatinization point while pressing out the mass under mechanical pressure to a thin cohesive layer which is simultaneously dried completely and comminuting the dry material.

The boiling or steaming process may be carried out with or without pressure. The material is preferably boiled with a limited amount of water, as in this case the result obtained is generally better than when the mass is merely subjected to a steaming process.

It has been found that, in spite of the large amount of proteins and other non-starch substances in the leguminosae, in the manner described a flour is obtained which readily swells in cold water. This is especially the case, when, after the heating and drying process the said flour is ground to a higher degree of fineness than is customary for the ordinary cold swelling starches.

The process is of particular importance for the treatment of leguminosae which in an unboiled condition contain poisonous substances, as is the case with most bean varieties. It is a well known fact that the toxicity of beans will disappear when they are boiled for a sufficient length of time. Practice has shown, however, that this is not always done in the correct way by those who use beans for the manufacture of foodstuffs, for instance bakers, and several times instances of poisoning, particularly caused by scarlet beans, have already occurred. In order to prevent with certainty the occurrence of cases of poisoning, it is therefore very useful to depoison the beans in a central plant prior to being used for foodstuffs. This is also made possible by the process according to the invention; it has appeared that, as a result of the boiling or steaming process according to the invention and the subsequent heating process, the poisonous properties will completely disappear, so that there is not the least objection to using poisonous scarlet beans or the like for the manufacture of foodstuffs, when treated by the process described. Tests on white mice, which are highly sensitive to the poison of scarlet beans, have confirmed this.

The products obtained in accordance with the invention can be used as such; as compared with the non-treated leguminosae, they do not only possess the advantage of swelling already in cold water, but also of having a better digestibility. They are further suitable for being mixed with other foodstuffs, for instance with flour mixtures for bakery purposes, in which case they have the advantage of not affecting unfavourably the water-binding capacity of the flour, and, with additions such as dried vegetables and the like, for the composition of dry soup preparations, from which, owing to the swelling properties of the product, nourishing soups can be prepared in a quick and easy way.

Example

To 100 kg. of white scarlet beans so much water is added that they are well submerged in it. They swell and absorb approximately their own weight of water. The swollen beans are steamed for 1 hour at atmospheric or slightly elevated pressure or boiled. The beans which have now become soft, are thoroughly mixed and comminuted, and subsequently treated in the manner customary for manufacturing cold swelling starch. The dry product is ground and sieved on sieve No. 70.

I claim:

1. A process of manufacturing dry foodstuffs in cooked condition from leguminosae comprising precooking the previously comminuted leguminosae for a period of at least half an hour, subsequently heating the precooked leguminosae in the presence of 50-200% of water, calculated on the dry material, on a rotary drum to a high temperature above the gelatinization point, while pressing out the mass under mechanical pressure to a thin cohesive layer which is simultaneously dried completely and comminuting the dry material.

2. A process according to claim 1 in which the dry material is comminuted to such fineness as to pass a 70-mesh sieve.

3. A process of manufacturing dry foodstuffs in cooked condition from poisonous beans comprising precooking the previously comminuted beans for a period of at least half an hour, subsequently heating the precooked leguminosae in the presence of 50-200% of water, calculated on the dry material, on a rotary drum to a high temperature above the gelatinization point, while pressing out the mass under mechanical pressure to a thin cohesive layer which is simultaneously dried completely and comminuting the dry material.

4. A process according to claim 3 in which the dry material is comminuted to such fineness as to pass a 70-mesh sieve.

FREDRIK ANDRÉ MÖLLER.

REFERENCES CITED

The following references are of record in the file of this patent:

UNITED STATES PATENTS

| Number | Name | Date |
| --- | --- | --- |
| 2,141,364 | Robinson | Dec. 27, 1938 |
| 2,297,502 | Rudolph | Sept. 29, 1942 |
| 2,316,014 | Alcott | Apr. 6, 1943 |
| 2,334,059 | Bauer | Nov. 9, 1943 |
| 2,343,149 | Krause | Feb. 29, 1944 |
| 2,391,829 | Huber | Dec. 25, 1945 |